United States Patent
Lau et al.

(10) Patent No.: US 6,469,123 B1
(45) Date of Patent: Oct. 22, 2002

(54) COMPOSITIONS AND METHODS FOR THERMOSETTING MOLECULES IN ORGANIC COMPOSITIONS

(75) Inventors: Kreisler S. Lau, Sunnyvale; Feng Quan Liu, Cupertino; Boris A. Korolev; Emma Brouk, both of San Jose; Ruslan Zherebin, Daly City, all of CA (US); David Nalewajek, West Seneca, NY (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 09/618,945

(22) Filed: Jul. 19, 2000

(51) Int. Cl.$^7$ ............................................... C08G 63/78
(52) U.S. Cl. ........................ 528/86; 528/205; 528/207; 528/208; 528/211; 525/132; 525/149; 525/152; 525/168; 525/177
(58) Field of Search .......................... 528/86, 205, 207, 528/208, 211; 525/132, 149, 152, 168, 177

(56) References Cited

U.S. PATENT DOCUMENTS

| | | | |
|---|---|---|---|
| 5,347,063 A | 9/1994 | Shen et al. | 585/352 |
| 5,458,709 A | 10/1995 | Kamezaki et al. | 156/89 |
| 5,744,399 A | 4/1998 | Rostoker et al. | 438/622 |

OTHER PUBLICATIONS

Reichert et al., "Highly crosslinked polymers based on acetylene derivatives of tetraphenyladamantane", 1994, Journal, Chem Abstract 121: 256441.*
Yao et al., "Facile convergent route to molecular caltrops", 1999, Journal, Chem Abstract 130: 267486.*
Chen, et al. entitled, "Diamond Derivatives for Pharmaceutical Use" dated 1993.

* cited by examiner

Primary Examiner—Duc Truong
(74) Attorney, Agent, or Firm—Sandra P. Thompson; Robert D. Fish; Rutan & Tucker, LLP

(57) ABSTRACT

In a method of producing a low dielectric constant polymer, a thermosetting monomer is provided, wherein the thermosetting monomer has a cage compound or aryl core structure, and a plurality of arms that are covalently bound to the cage compound or core structure. In a subsequent step, the thermosetting monomer is incorporated into a polymer to form the low dielectric constant polymer, wherein the incorporation into the polymer comprises a chemical reaction of a triple bond that is located in at least one of the arms. Contemplated cage compounds and core structures include adamantane, diamantane, silicon, a phenyl group and a sexiphenylene group, while preferred arms include an arylene, a branched arylene, and an arylene ether. The thermosetting monomers may advantageously be employed to produce low-k dielectric material in electronic devices, and the dielectric constant of the polymer can be controlled by varying the overall length of the arms.

14 Claims, 9 Drawing Sheets

COMPOSITIONS AND METHODS FOR THERMOSETTING MOLECULES IN ORGANIC COMPOSITIONS

FIELD OF THE INVENTION

The field of the invention is reduction of dielectric constants.

BACKGROUND OF THE INVENTION

As interconnectivity in integrated circuits increases and the size of functional elements decreases, the dielectric constant of insulator materials embedding the metallic conductor lines in integrated circuits becomes an increasingly important factor influencing the performance of the integrated circuit. Insulator materials having low dielectric constants (i.e., below 3.0) are especially desirable, because they typically allow faster signal propagation, reduce capacitive effects and cross talk between conductor lines, and lower voltages to drive integrated circuits.

Since air has a dielectric constant of about 1.0, a major goal is to reduce the dielectric constant of insulator materials down towards a theoretical limit of 1, and several methods are known in the art for including air into the insulator materials to reduce the dielectric constant of such materials. In some methods, air is introduced into the insulator material by generating nanosized voids in a composition comprising an adequately crosslinked thermostable matrix and a thermolabile (thermally decomposable) portion, which is either separately added to the thermostable matrix material (physical blending approach), or built-in into the matrix material (chemical grafting approach). In general, the matrix material is first crosslinked at a first temperature to obtain a three-dimensional matrix, then the temperature is raised to a second, higher temperature to thermolyze the thermolabile portion, and cured at a third, still higher temperature to anneal and stabilize the desired nanoporous material that has voids corresponding in size and position to the size and position of the thermolabile portion.

In both the physical blending approach and the chemical grafting approach, nanoporous materials with desirable dielectric constants of about 2.5 and below may be achieved. However, while there is typically only poor control over pore size and pore distribution in the physical blending approach, the chemical grafting approach frequently poses significant challenges in the synthesis of the polymers and prepolymers and inclusion of various reactive groups (e.g., to enable cross-linking, addition of thermolabile groups, etc.) into the polymers and prepolymers. Moreover, the chemical nature of both the thermolabile portion and thermostable matrix generally limits processing temperatures to relatively narrow windows which must distinguish the crosslinking (cure) temperature, thermolysis temperature and glass transition temperature, thereby significantly limiting the choice of available materials.

In other methods, air or other gas (i.e. voids) is introduced into the insulator material by incorporation of hollow, nanosized spheres in the matrix material, whereby the nanosized spheres acts as a "void carriers", which may or may not be removed from the matrix material. For example, in U.S. Pat. No. 5,458,709 to Kamezaki et al., the inventors teach the use of hollow glass spheres in an insulator material. However, the distribution of the glass spheres is typically difficult to control, and with increasing concentration of the glass spheres, the dielectric material loses flexibility and other desirable physico-chemical properties. Furthermore, glass spheres are generally larger than 20 nm, and are therefore not suitable for nanoporous materials where pores smaller than 2 nm are desired.

To produce pores with a size substantially smaller than glass spheres, Rostoker et al. describe in U.S. Pat. No. 5,744,399 the use of fullerenes as void carriers. Fullerenes are a form of carbon containing from 32 atoms to about 960 atoms, which are believed to have the structure of a spherical geodesic dome, many of which are believed to occur naturally. The inventors mix a matrix material with fullerenes, and cure the mixture to fabricate a nanoporous dielectric, wherein the fullerenes may be removed from the cured matrix. Although the pores obtained in this manner are generally very uniform in size, homogeneous distribution of the void carriers still remains problematic. Moreover, both Rostoker's and Kamezaki's methods require addition or admixture of the void carriers to a polymeric material, thereby adding essential processing steps and cost in the fabrication of nanoporous materials.

Although various methods are known in the art to introduce nanosized voids into low dielectric constant material, all, or almost all of them have disadvantages. Thus, there is still a need to provide improved compositions and methods to introduce nanosized voids in dielectric material.

SUMMARY OF THE INVENTION

The present invention is directed to a method of producing a low dielectric constant polymer. In one step, a star-shaped thermosetting monomer having a core structure and a plurality of arms is provided, and in a subsequent step the thermosetting monomer is incorporated into a polymer, wherein the incorporation into the polymer comprises a reaction of a triple bond that is located in at least one arm.

In one aspect of the inventive subject matter, the core structure is a cage compound or aryl, and preferred arms are aryl, branched aryl or arylene ether. It is also preferred that where the core structure is a cage compound, at least one of the arms has a triple bond. Where the core structure is an aryl compound, it is preferred that all of the arms have a triple bond. Especially contemplated core structures include adamantane, diamantane, a phenyl, and a sexiphenylene, and especially contemplated arms include a tolanyl, a phenylethynylphenylethynylphenyl, a p-tolanylphenyl, a 1,2-bis(phenylethynyl)phenyl, and a p-tolanylphenyl ether.

In another aspect of the inventive subject matter, the incorporation of the thermosetting monomer includes a reaction on more than one triple bond, preferably on three triple bonds located on three arms, and more preferably on all triple bonds located in all arms. In particularly preferred aspects of the inventive subject matter, the incorporation takes place without participation of an additional molecule and preferably comprises a cyclo-addition reaction.

While it is generally contemplated that the thermosetting monomer is incorporated in a backbone of a polymer, other positions including the termini and side chains are also appropriate. Preferred polymers include poly(arylene ethers) and polymers comprising, or consisting of contemplated thermosetting monomers. It is especially contemplated that by increasing the length of the arms of the thermosetting monomers, the monomers will define an increased void volume between the monomers after crosslinking, thereby decreasing the density of the crosslinked structure and decreasing the dielectric constant of the polymer.

Various objects, features, aspects and advantages of the present invention ill become more apparent from the following detailed description of preferred embodiments of the invention, along with the accompanying drawing.

DETAILED DESCRIPTION

As used herein, the term "low dielectric constant polymer" refers to an organic, organiometallic, or inorganic polymer with a dielectric constant of approximately 3.0, or lower. As also used herein, the term "cage compound" refers to a molecule in which a plurality of rings formed by covalently bound atoms define a volume, such that a point located within the volume can not leave the volume without passing through a ring. For example, adamantane-type structures, including adamantane and diamantane are considered a cage compound. In contrast, ring compounds with a single bridge such as norbornane (bicyclo[2.2.1]heptane) are not considered a cage compound, because the rings in a single bridged ring compound do not define a volume.

In a method of producing a low dielectric constant polymer, a thermosetting, monomer is provided having a general structure as shown in Structure 1,

Figure 1A:
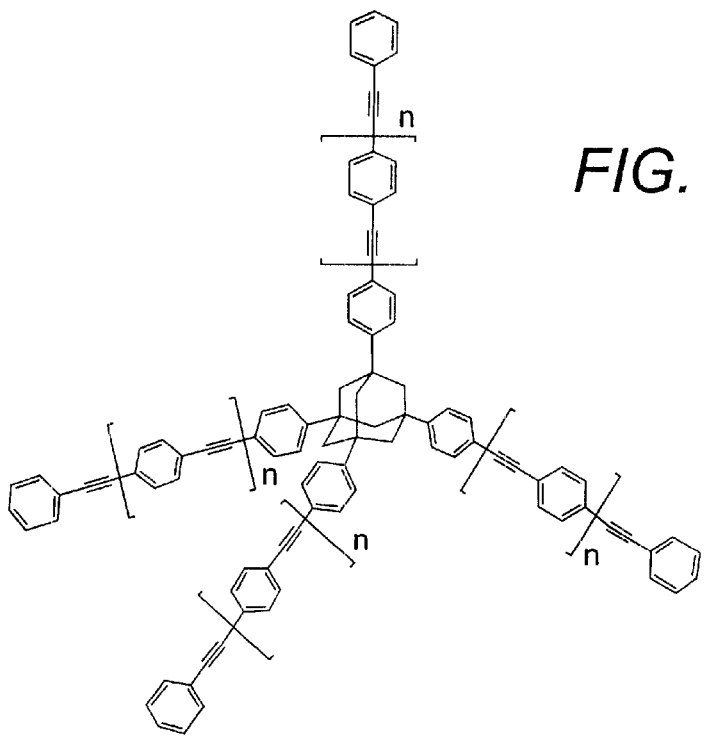
FIGS. 1A–1C are exemplary structures for star shaped thermosetting monomers having an adamantane, a diamantane, and a silicon atom as a cage compound, respectively.
Figure 1B:
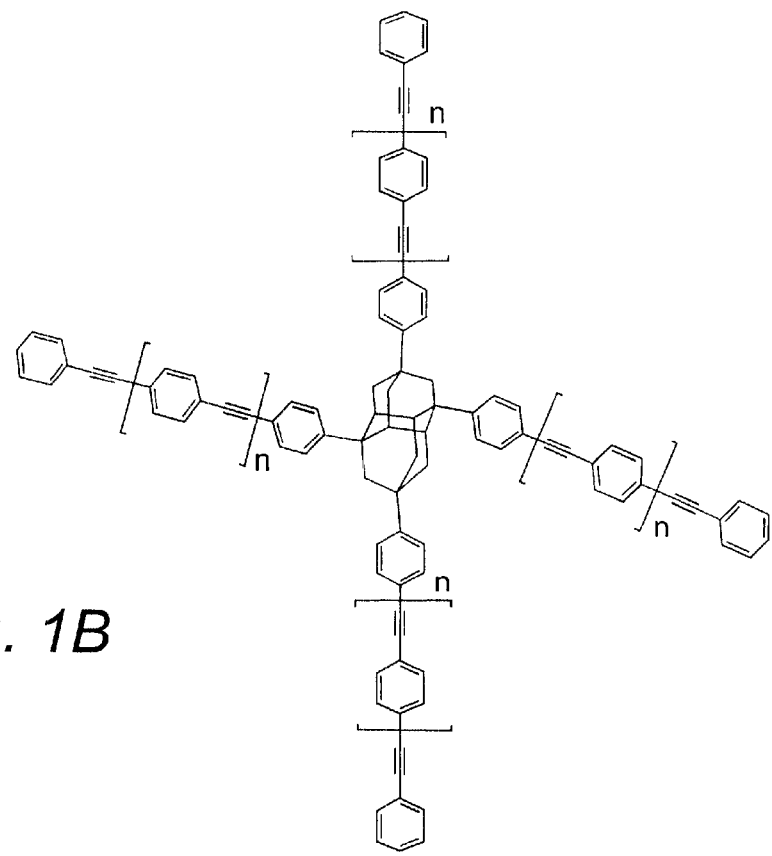
Figure 1C:
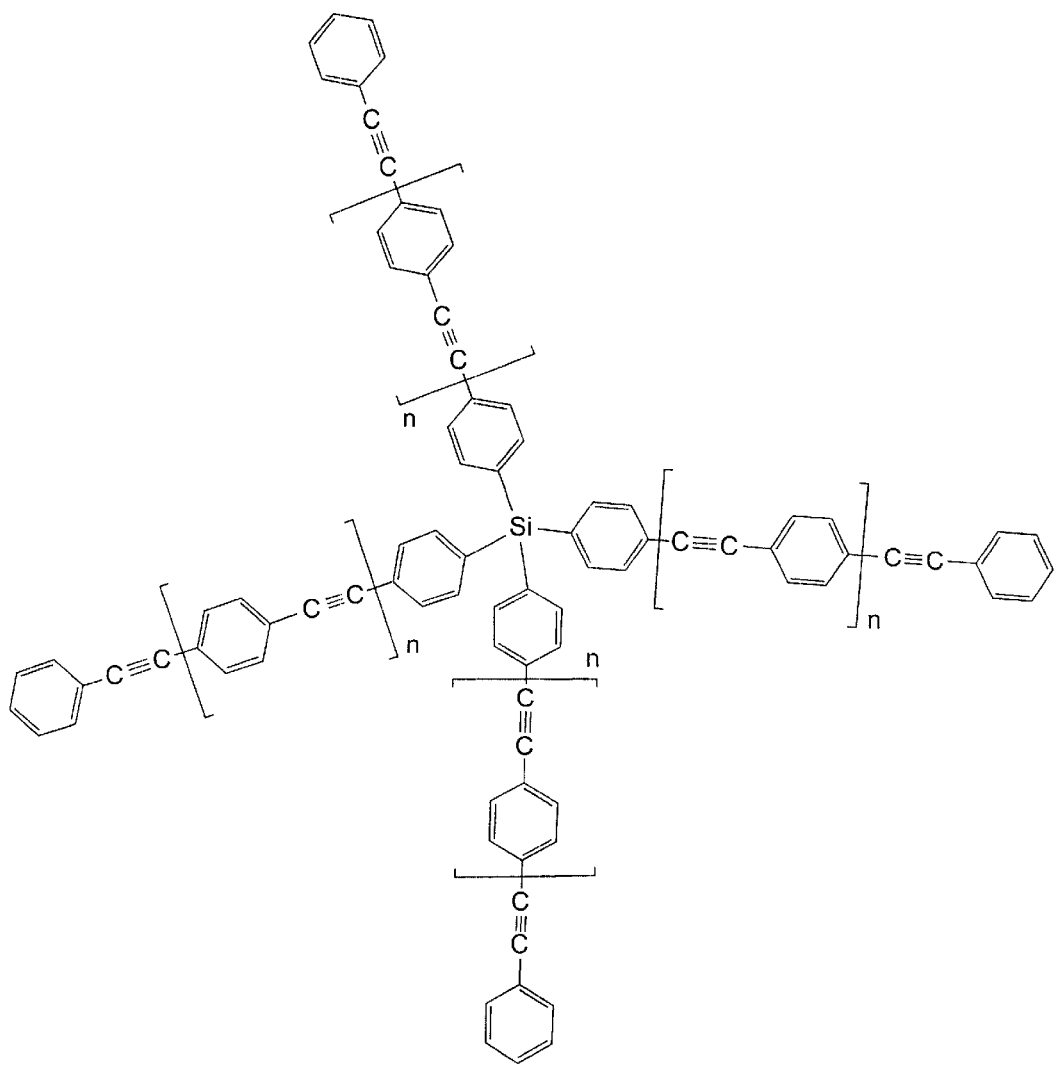

(Structure 1)

wherein Y is selected from a cage compound and a silicon atom, and $R_1$, $R_2$, $R_3$, and $R_4$ are independently selected from an aryl, a branched aryl, and an arylene ether, and wherein at least one of the aryl, the branched aryl, and the arylene ether has a triple bond. In a further step, the thermosetting monomer is incorporated into a polymer thereby forming the low dielectric constant polymer, wherein the incorporation into the polymer comprises a chemical reaction of the at least one triple bond. As used herein, the term "aryl" without further specification means aryl of any type, which may include, for example a branched aryl, or an arylene ether. Exemplary structures of thermosetting monomers that include an adamantane, a diamantane, and a silicon atom are shown in FIGS. 1A, 1B, and 1C, respectively, wherein n is an integer between zero and five, or more.

In another method of producing a low dielectric constant polymer, a thermosetting, monomer is provided having a general structure as shown in Structure 2,

Figure 2A:
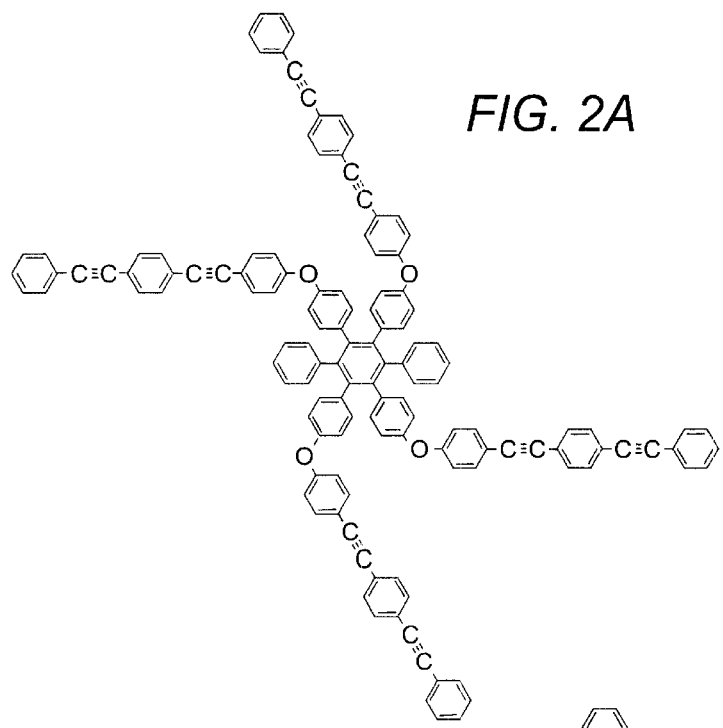
FIGS. 2A–2D are exemplary structures for star shaped thermosetting monomers having a sexiphenylene as an aryl group.
Figure 2B:
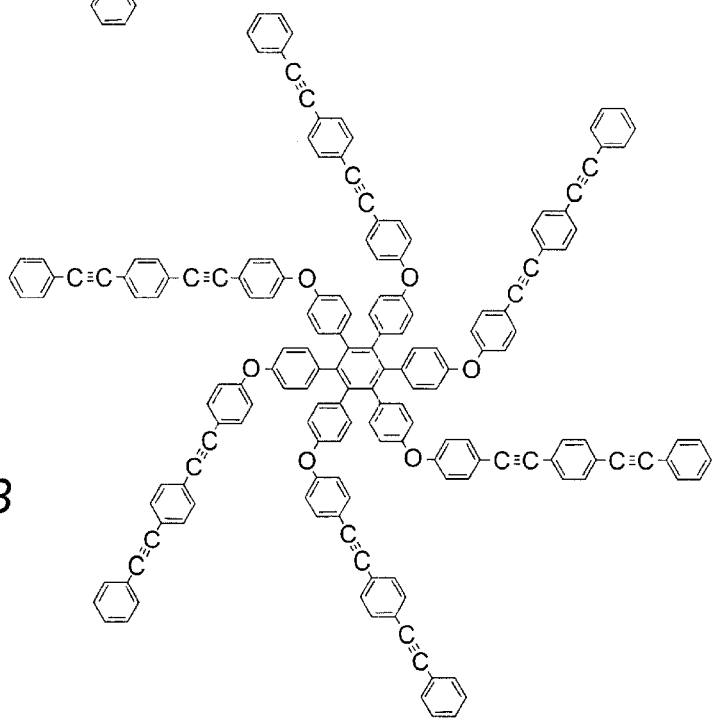

(Structure 2)

wherein Ar is an aryl, and $R'_1$–$R'_6$ are independently selected from an aryl, a branched aryl, an arylene ether and wherein each of the aryl, the branched aryl, and the arylene ether have at least one triple bond In a subsequent step, the thermosetting monomer is incorporated into a polymer thereby forming a low dielectric constant polymer, wherein the incorporation into the polymer comprises a chemical reaction of the at least one triple bond. Exemplary structures of thermosetting monomers that include a tetra-, and a hexasubstituted sexiphenylene are shown in FIGS. 2A and 2B, respectively.

Figure 2C:
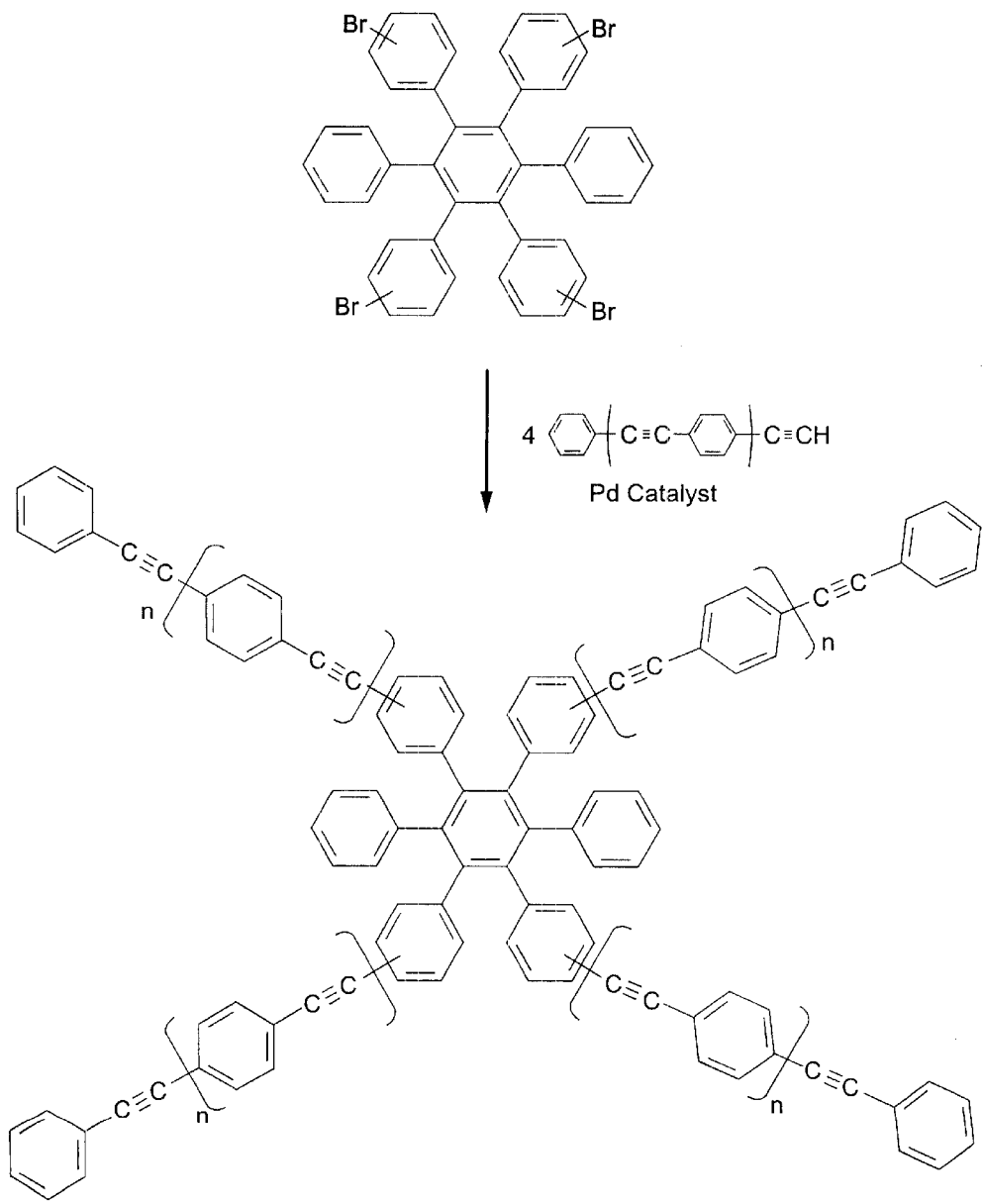
Figure 2D:
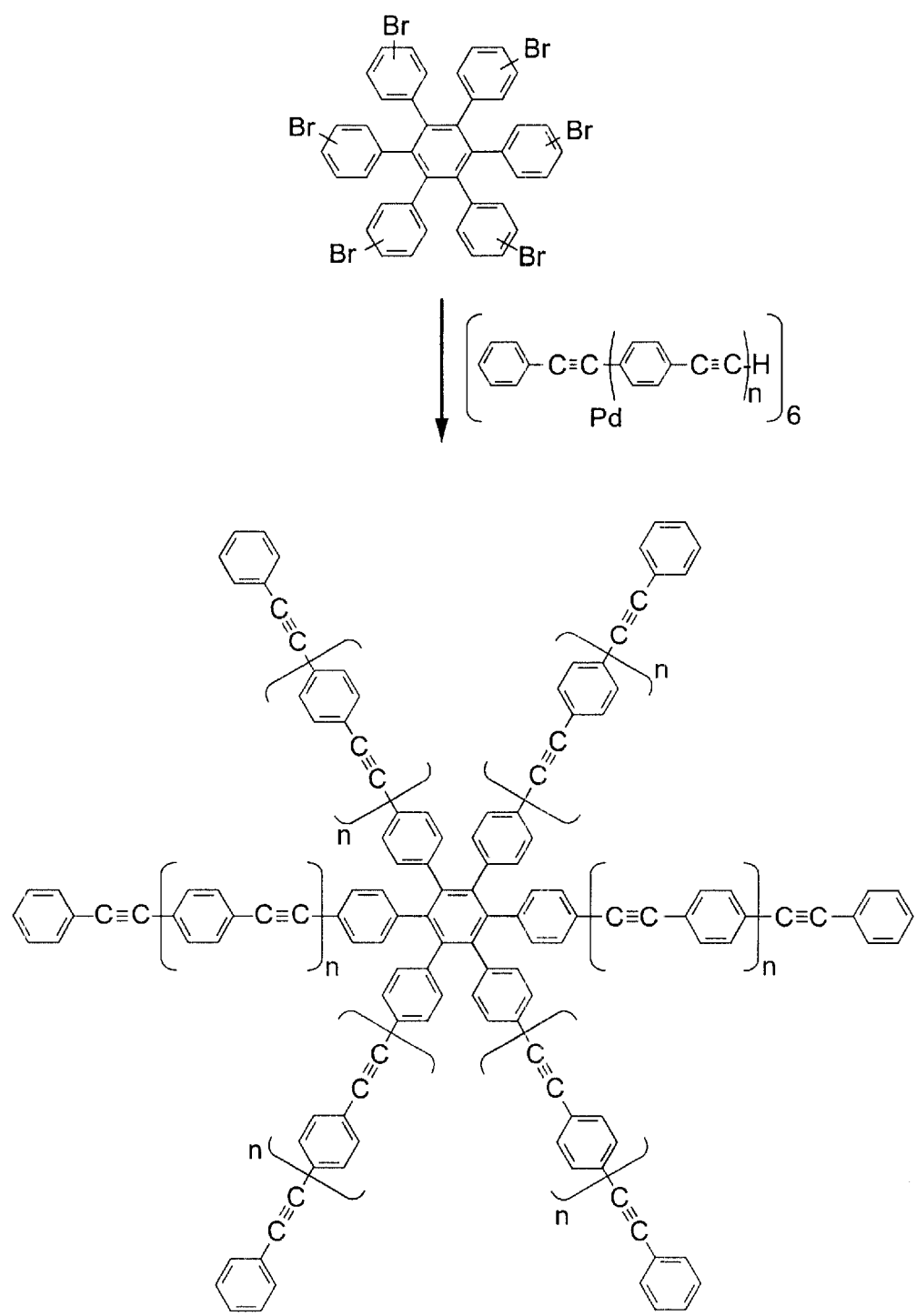
Figure 3A:
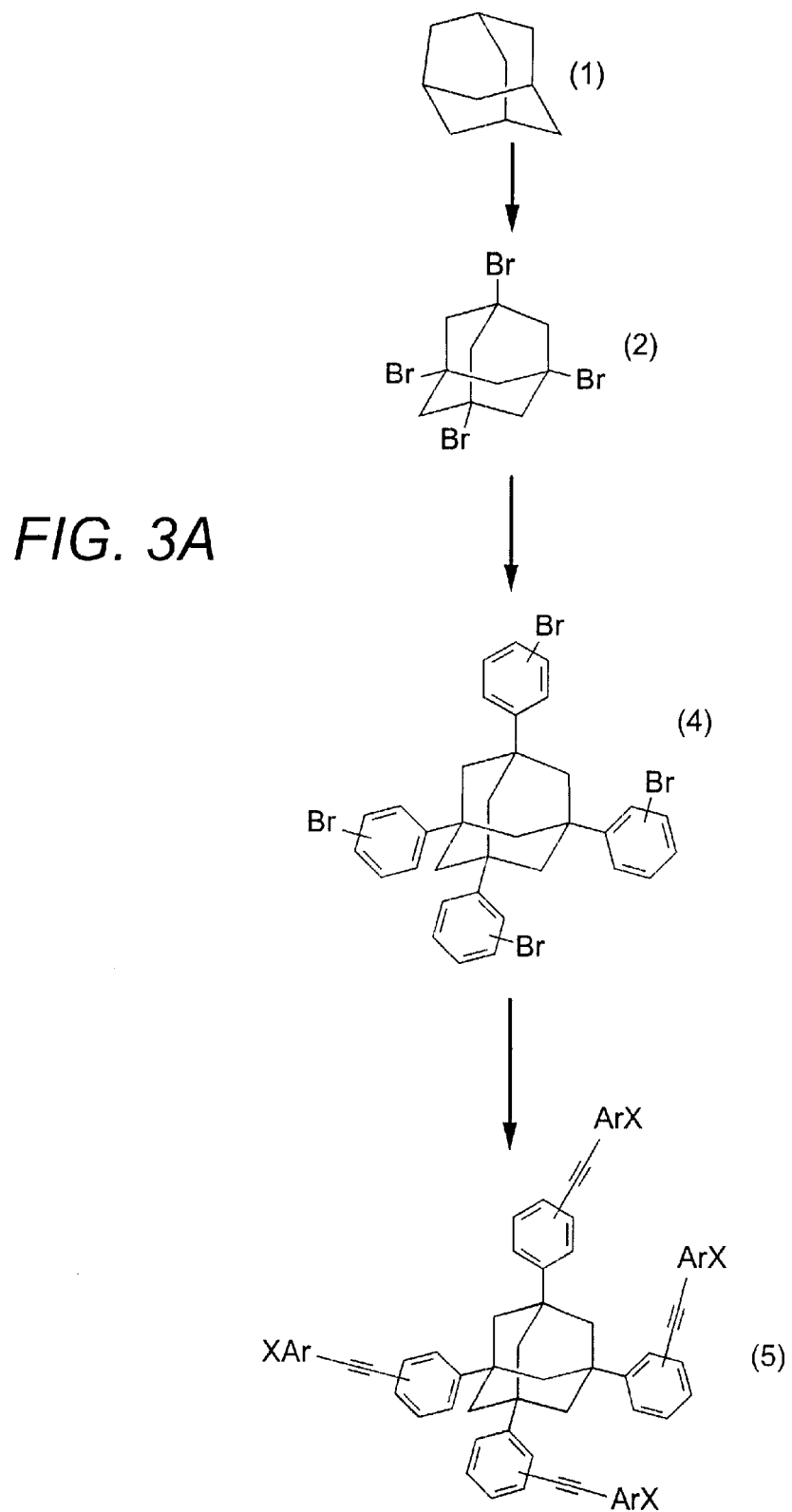
FIGS. 3A–3C are exemplary synthetic schemes for star shaped thermosetting monomers according to the inventive subject matter.
Figure 3B:
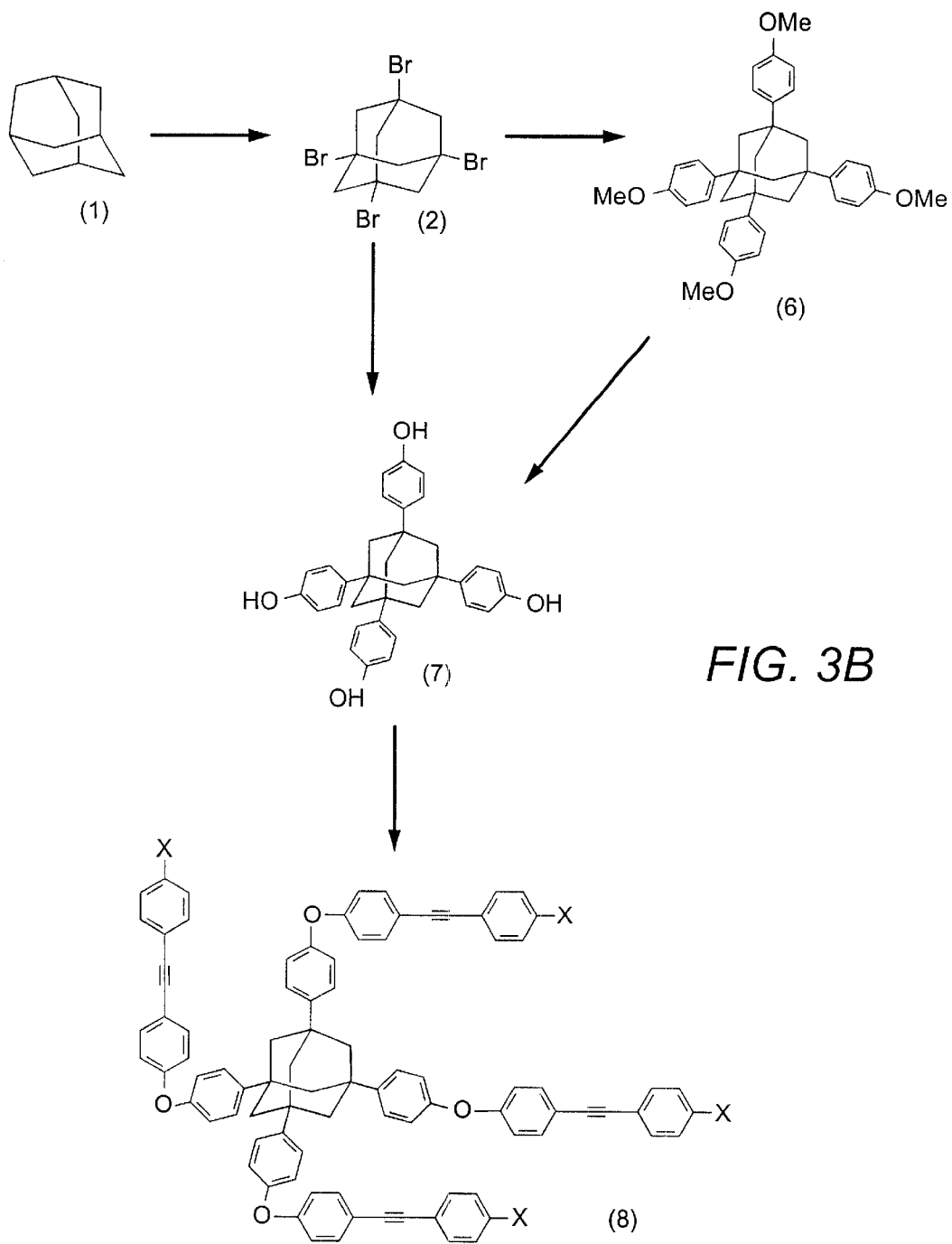
Figure 3C:
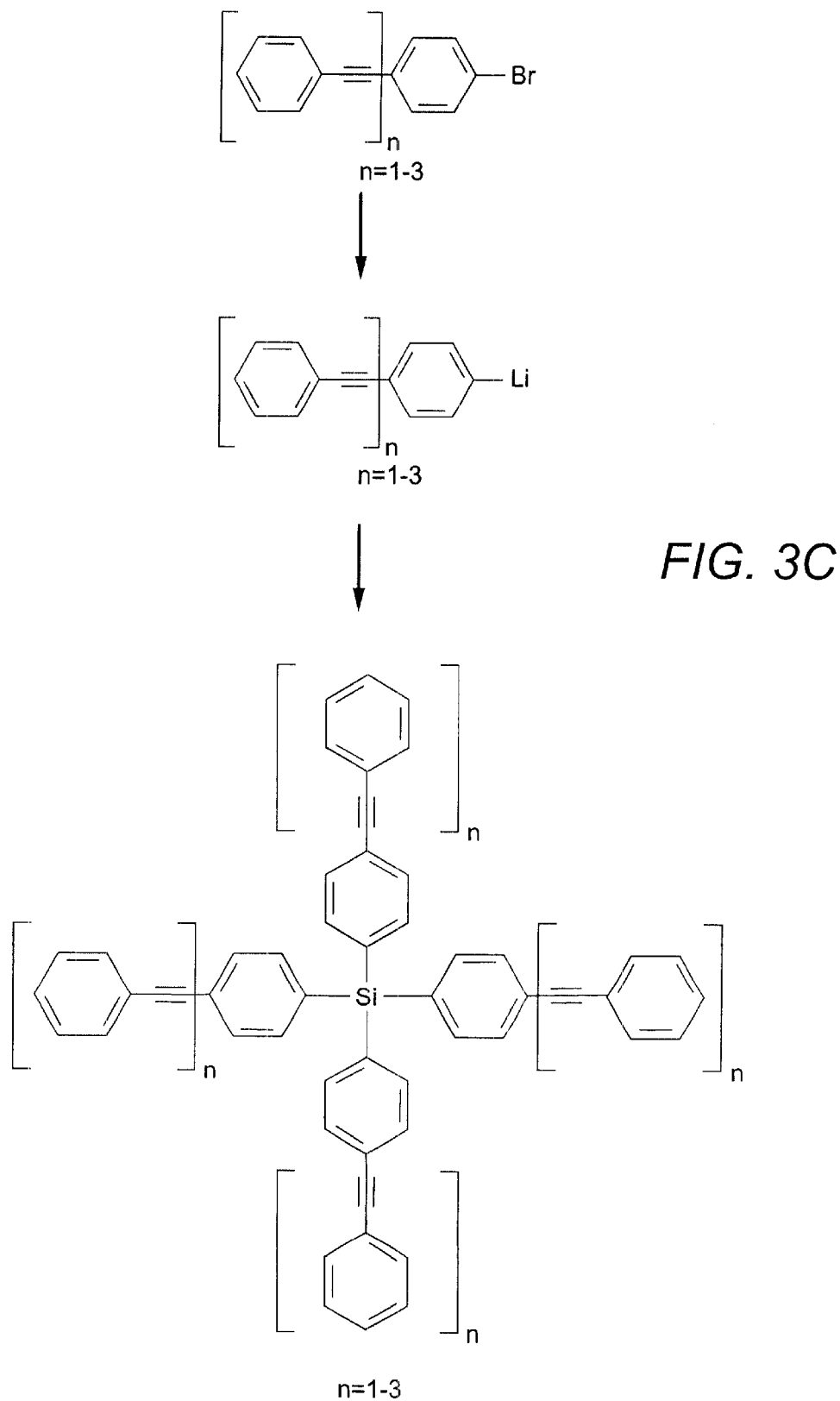

Thermosetting monomers as generally shown in Structures 1 and 2 may be provided by various synthetic routes, and exemplary synthetic strategies for Structures 1 and 2 are shown in FIGS. 3A–3C. FIG. 3A depicts a preferred synthetic route for the generation of star shaped thermosetting monomers with an adamantane as a cage compound, in which a bromoarene is phenylethynylated in a palladium catalyzed Heck reaction. First, adamantane (1) is brominated to tetrabromoadamantane (TBA) (2) following a procedure previously described (*J. Org. Chem.* 45, 5405–5408 (1980) by Sollot, G. P. and Gilbert, E. E.). TBA is reacted with phenyl bromide to yield tetrabromophenyladamantane (TBPA) (4) as described in *Macromolecules*, 27, 7015–7022 (1990) by Reichert, V. R, and Mathias L. J., and TBPA is subsequently reacted with a substituted ethynylaryl in a palladium catalyzed Heck reaction following standard reaction procedures to yield tetraarylethynylphenyladamntane (TAEPA) (5). The palladium-catalyzed Heck reaction may also be employed for the synthesis of a star shaped thermosetting monomer with a sexiphenylene as the aromatic portion as shown in FIG. 2C and FIG. 2D, in which a tetrabromosexiphenylene and a hexabromosexiphenylene, respectively, is reacted with an ethynylaryl to yield the desired corresponding star shaped thermosetting monomer.

Alternatively, TBA (supra) can be converted to a hydroxyarylated adamantane, which is subsequently transformed into a star shaped thermosetting monomer in a nucleophilic aromatic substitution reaction. In FIG. 3B, TBA (2) is generated from adamantane (1) as previously described, and further reacted in an electrophilic tetrasubstitution with phenol to yield tetrakis(hydroxyphenyl) adamantane (THPA) (7). Alternatively, TBA can also be reacted with anisole to give tetrakis(4-methoxyphenyl)adamantane (TMPA) (6), which can further be reacted with $BBr_3$ to yield THPA (7). THPA can then be reacted in various nucleophilic aromatic substitution reactions with activated fluoroaromatics in the presence of potassium carbonate employing standard procedures (e.g., Engineering Plastics—A Handbook of Polyarylethers by R. J. Cotter, Gordon and Breach Publishers, ISBN 2-88449-112-0) to produce the desired thermosetting monomers, or THPA may be reacted with 4-halo-4'-fluorotolane (with halo=Br or I) in a standard aromatic substitution reaction (e.g., Engineering Plastics, supra) to yield tetrakis[4-(4-halophenylethynylphenoxy) phenyl]adamanate (8). In further alternative reactions, various alternative reactants may also be employed to generate the shaped thermosetting monomers. Similarly, the nucleophilic aromatic substitution reaction may also be utilized in a synthesis of a star shaped thermosetting monomer with a sexiphenylene as the aromatic portion as depicted in FIG. 2D, in which sexiphenylene is reacted with 4-fluorotolane to produce a star shaped thermosetting monomer. Alternatively, phloroglucinol may be reacted in a standard aromatic substitution reaction with 1-(4-fluorophenyl-ethynyl-4-phenyl-ethynyl)-4-benzene to yield 1,3,5-tris (phenylethynylphenylethynylphenoxy)benzene.

Where the cage compound is a silicon atom, an exemplary preferred synthetic scheme is depicted in FIG. 3C, in which bromo(phenylethynyl)aromatic arms (9) are converted into the corresponding lithium(phenylethynyl)aromatic arms (10), which are subsequently reacted with silicon tetrachloride to yield the desired star shaped thermosetting monomer with a silicon atom as a cage compound.

Although it is preferred that the cage compound is an adamantane or diamantane, in alternative aspects of the inventive subject matter, various cage compounds other than an adamantane or diamantane are also contemplated. It should be especially appreciated that the molecular size and configuration of the cage compound in combination with the overall length of the arms $R_1$–$R_4$ or $R'_1$–$R'_6$ will determine the size of voids in the final low dielectric constant polymer (by steric effect). Therefore, where relatively small cage compounds are desirable, substituted and derivatized adamantanes, diamantanes, and relatively small, bridged cyclic aliphatic and aromatic compounds (with typically less than 15 atoms) are contemplated. In contrast, in cases where larger cage compounds are desirable, larger bridged cyclic aliphatic and aromatic compounds (with typically more than 15 atoms) and fullerenes are contemplated.

It should further be appreciated that contemplated cage compounds need not necessarily be limited to carbon atoms, but may also include heteroatoms such as N, S, O, P, etc. Heteroatoms may advantageously introduce non-tetragonal bond angle configurations, which may in turn enable covalent attachment of arms $R_1$–$R_4$ or $R'_1$–$R'_6$ at additional bond angles. With respect to substitutents and derivatizations of contemplated cage compounds, it should be recognized that many substitutents and derivatizations are appropriate. For example, where the cage compounds are relatively hydrophobic, hydrophilic substituents may be introduced to increase solubility in hydrophilic solvents, or vice versa. Alternatively, in cases where polarity is desired, polar side groups may be added to the cage compound. It is further contemplated that appropriate substituents may also include thermolabile groups, nucleophilic and electrophilic groups. It should also be appreciated that functional groups may be employed in the cage compound (e.g., to facilitate crosslinking reactions, derivatization reactions, etc.) Where the cage compounds are derivatized, it is especially contemplated that derivatizations include halogenation of the cage compound, and a particularly preferred halogen is fluorine.

In further alternative aspects of the inventive subject matter, the cage compound may be replaced by a non-carbon atom with a polygonal, more preferably tetragonal configuration. Contemplated atoms include a silicon atom, and particularly contemplated atoms include atoms that exhibit polygonal ligand configuration and form covalent bonds with a resistance to oxidation greater than a carbon-carbon bond. Furthermore, alternative atoms may also include cationic and anionic species of a particular atom. For example, appropriate atoms are Ge, and P.

Where the thermosetting monomer has an aryl coupled to the arms $R'_1$–$R'_6$ as shown in Structure 2, it is preferred that the aryl comprises a phenyl group, and it is even more preferred that the aryl is a phenyl group or a sexiphenylene. In alternative aspects of the inventive subject matter, it is contemplated that various aryl compounds other than a phenyl group or a sexiphenylene are also appropriate, including substituted and unsubstituted bi- and polycyclic aromatic compounds. Substituted and unsubstituted bi- and polycyclic aromatic compounds are particularly advantageous, where increased size of the thermosetting monomer is preferred. For example, where it is desirable that alternative aryls extend in one dimension more than in another dimension, naphthalene, phenanthrene, and anthracene are particularly contemplated. In other cases, where it is desirable that alternative aryls extend symmetrically, polycyclic aryls such as a coronene are contemplated. In especially preferred aspects, contemplated bi- and polycyclic aryls have conjugated aromatic systems that may or may not include heteroatoms. With respect to substitutions and derivatizations of contemplated aryls, the same considerations apply as for cage compounds (vide supra).

With respect to the arms $R_1$–$R_4$ and $R'_1$–$R_6$, it is preferred that $R_1$–$R_4$ are individually selected from an aryl, a branched aryl, and an arylene ether, and $R'_1$–$R'_6$ are individually selected from an aryl, a branched aryl and all arylene ether and nothing. Particularly contemplated aryls for $R_1$–$R_4$ and $R'_1$–$R'_6$ include aryls having a tolanyl, a phenylethynylphenylethynylphenyl, and a p-tolanylphenyl moiety, and tolanyl, phenylethynylphenylethynylphenyl, and p-tolanylphenyl moieties. Especially preferred branched aryls include a 1,2-bis(phenylethynyl)phenyl, and particularly contemplated arylene ethers include p-tolanylphenyl ether.

In alternative aspects of the inventive subject matter, appropriate arms need not be limited to an aryl, a branched aryl, and an arylene ether, so long as alternative arms $R_1$–$R_4$ and $R'_1$–$R'_6$ comprise a reactive group, and so long as the incorporation of the thermosetting monomer comprises a reaction involving the reactive group. The term "reactive group" as used herein refers to any element or combinations of elements having sufficient reactivity to be used in incorporating the monomer into a polymer. For example, contemplated arms may be relatively short with no more than six atoms, which may or may not be carbon atoms. Such short arms may be especially advantageous where the size of voids incorporated into the final low dielectric constant polymer need to be relatively small. In contrast, where especially long arms are preferred, the arms may comprise a oligomer or polymer with 7–40, and more atoms. Furthermore, the length as well as the chemical composition of the arms covalently coupled to the contemplated thermosetting monomers may vary within one monomer. For example, a cage compound may have two relatively short arms and two relatively long arms to promote dimensional growth in a particular direction during polymerization. In another example, a cage compound may have two arms chemically distinct from another two arms to promote regioselective derivatization reactions.

It should further be appreciated that while it is preferred that all of the arms in a thermosetting movomer have at least one reactive group, in alternative aspects less than all of the arms need to have a reactive group. For example, a cage compound may have 4 arms, and only 3 or two of the arms carry a reactive group. Alternatively, an aryl in a thermosetting monomer may have three arms wherein only two or one arm has a reactive group. It is generally contemplated that the number of reactive groups in each of the arms $R_1$–$R_4$ and $R'_1$–$R'_6$ may vary considerably, depending on the chemical nature of the arms and of the qualities of the desired end product. Moreover, reactive groups are contemplated to be positioned in any part of the arm, including the backbone, side chain or terminus of an arm. It should be especially appreciated that the number of reactive groups in the thermosetting monomer may be employed as a tool to control the degree of crosslinking. For example, where a relatively low degree of crosslinking is desired, contemplated thermosetting monomers may have only one or two reactive groups, which may or may not be located in one arm. On the other hand, where a relatively high degree of crosslinking is required, three or more reactive groups may be included into the monomer. Preferred reactive groups include electrophilic and nucleophilic groups, more preferably groups that may participate in a cyclo addition reaction and a particularly preferred reactive group is an ethynyl group.

In addition to reactive groups in the arms, other groups, including functional groups may also be included into the arms. For example, where addition of particular functionalities (e.g., a thermolabile portion) after the incorporation of the thermosetting monomer into a polymer is desirable, such functionalities may be covalently bound to the functional groups.

The thermosetting monomers can be incorporated into a polymer by a large variety of mechanisms, and the actual mechanism of incorporation predominantly depends on the reactive group that participates in the incorporation. Therefore, contemplated mechanisms include nucleophilic, electrophilic and aromatic substitutions, additions, eliminations, radical polymerizations, and cycloadditions, and a particularly preferred incorporation is a cycloaddition that involves at least one ethynyl group located at least one of the arms. For example, in a thermosetting monomer having arms selected from an aryl, a branched aryl and an arylene ether, in which at least three of the aryl, the branched aryl, and the arylene ether have a single triple bond, the incorporation of the monomer into the polymer may comprise a cycloaddition reaction (i.e. a chemical reaction) of at least three triple bonds. In another example, in a thermosetting monomer wherein all of the aryl, the branched aryl, and the arylene ether arms have a single triple bond, the incorporation of the monomer into the polymer may comprise a cycloaddition (i.e. a chemical reaction) of all of the triple bonds. In other examples, cycloadditions (e.g., a Diels-Alder reaction) may occur between an ethynyl group in at least one arm of the thermosetting monomer and a diene group located in a polymer. It is further contemplated that the incorporation of the thermosetting monomers into a polymer takes place without participation of an additional molecule (e.g., a crosslinker), preferably as a cyclo addition reaction between reactive groups of thermosetting monomers. However, in alternative aspects of the inventive subject matter, crosslinkers may be employed to covalently couple a thermosetting monomer to a polymer Such covalent coupling may thereby either occur between a reactive group and a polymer or a functional group and a polymer.

Depending on the mechanism of incorporation of the thermosetting monomer into the polymer, reaction conditions may vary considerably. For example, where a monomer is incorporated by a cycloaddition employing a triple bond of at least one of the arm, heating of the thermosetting monomer to approximately 250° C. for about 45 min is generally sufficient. In contrast, where the monomer is incorporated into a polymer by a radical reaction, room temperature and addition of a radical starter may be appropriate. A preferred incorporation is set forth in the examples.

With respect to the position of incorporation of the thermosetting monomer into polymer it is contemplated that thermosetting monomers may be incorporated into the backbone, a terminus or a side chain of the polymer. As used herein, the term "backbone" refers to a contiguous chain of atoms or moieties forming a polymeric strand that are covalently bound such that removal of any of the atoms or moiety would result in interruption of the chain.

Contemplated polymers include a large variety of polymer types such as polyimides, polystyrenes, polyamides, etc. However, it is especially contemplated that the polymer comprises a polyaryl, more preferably a poly(arylene ether).

In an even more preferred aspect, the polymer is fabricated at least in part from the thermosetting monomer, and it is particularly contemplated that the polymer is entirely fabricated from the thermosetting monomer.

It should be especially appreciated that (1) the size of the cage compound or the aryl, and (2) the overall length of the arms $R_1$–$R_4$ and $R'_1$–$R'_6$ that are covalently coupled to the cage compound will determine the nanoporosity imparted by a steric effect. Therefore, where a thermosetting monomer with a cage compound or a silicon atom is part of a low dielectric constant polymer, and wherein the arms $R_1$–$R_4$ have a total length L and the low dielectric constant polymer has a dielectric constant K, the dielectric constant K will decrease when L increases. Likewise, where a thermosetting monomer with an aryl is part of a low dielectric constant polymer, and wherein the arms $R'_1$–$R'_6$ have a total length L and the low dielectric constant polymer has a dielectric constant K, the dielectric constant K will decrease when L increases. Consequently, the size of the cage compound, the aryl, and particularly the size of the arms in a thermosetting monomer can be employed to fine tune or regulate the dielectric constant of a low dielectric constant polymer harboring the thermosetting monomer. It is especially contemplated that by extension of the arms in a thermosetting monomer the dielectric constant may be reduced in an amount of up to 0.2, preferably of up to 0.3, more preferably of up to 0.4 and most preferably of up to 0.5 dielectric constant units.

Figure 4:
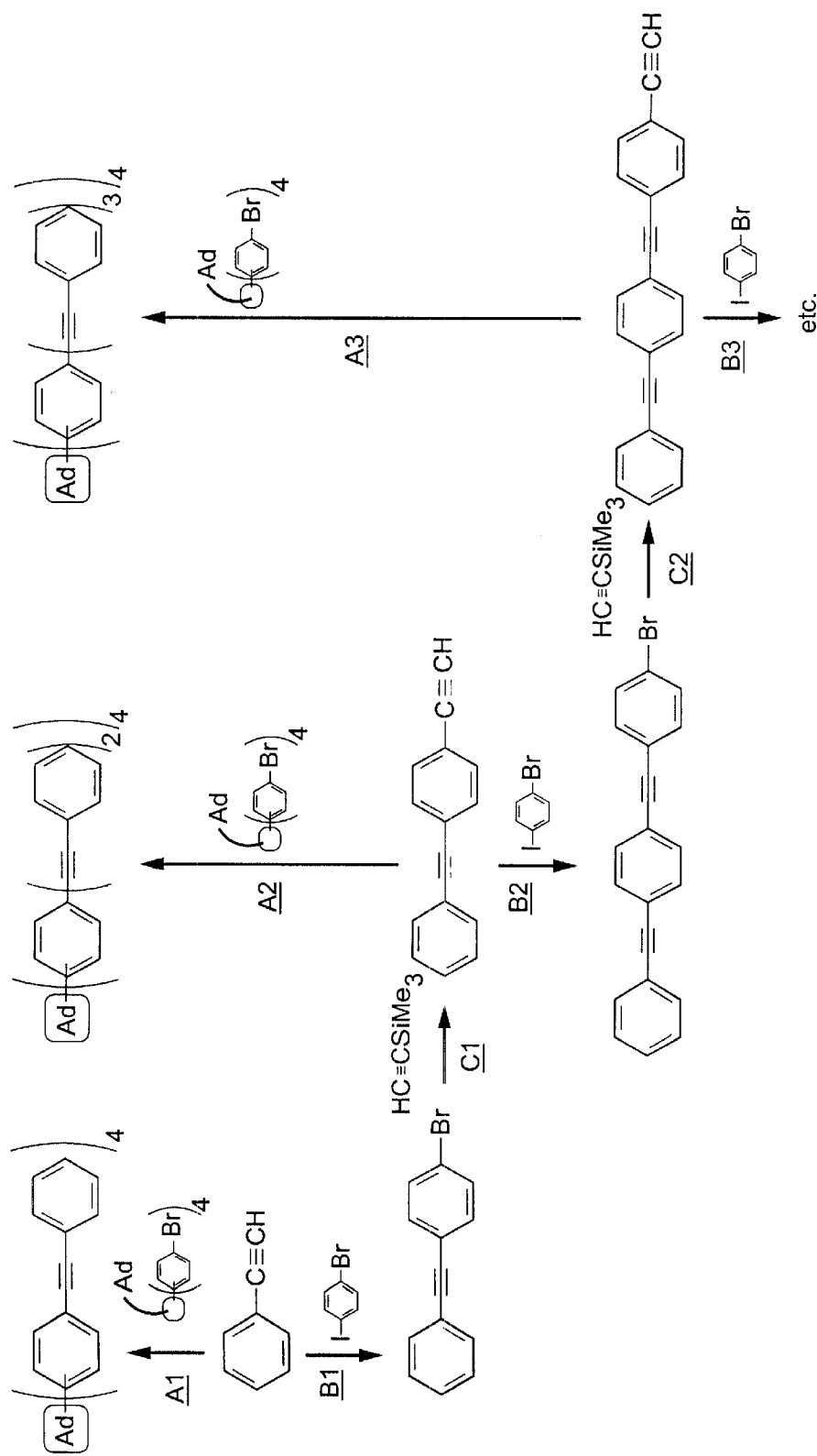
FIG. 4 is an exemplary scheme for the synthesis of substituted adamantanes with aryl arms of varying length.

In an especially contemplated arm extension strategy depicted in FIG. 4, in which AD represents an adamantane or diamantane group. Phenylacetylene is a starting molecule that is reacted (A1) with TBA (supra) to yield tetrakis(monotolanyl)-adamantane. Alternatively, phenylacetylene can be converted (B1) to tolanylbromide that is subsequently reacted (C1) with trimethylsilylacetylene to form tolanylacetylene. TBA can then be reacted (A2) with tolanylacetylene to tetrakis(bistolanyl)-adamantane. In a further extension reaction, tolanylacetylene is reacted (B2) with 1-bromo-4-iodobenzene to bistolanylbromide that is further converted (C2) to bistolanylacetylene. The so formed bistolanylacetylene may then be reacted (A3) with TBA to yield tetrakis(tristolanyl)-adamantane.

It is particularly contemplated that the thermosetting monomers according to the inventive subject matter may be employed in a dielectric layer of an electronic device, wherein preferred dielectric layers have a dielectric constant of less than 3, and preferred electric devices include an integrated circuit. Therefore, a contemplated electrical device may include a dielectric layer, wherein the dielectric layer comprises a polymer fabricated from a thermosetting monomer having the structures.

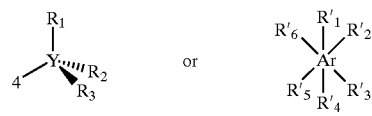

wherein Y is selected from a cage compound and a silicon atom, Ar is preferably an aryl, $R_1$–$R_4$ are independently selected from an aryl, a branched aryl, and an arylene ether, $R'_1$–$R'_6$ are independently selected from an aryl, a branched aryl, and an arylene ether and wherein at least one of the aryl, the branched aryl, and the arylene ether has a triple bond.

EXAMPLES

The following examples describe exemplary syntheses of thermosetting molecules according to the inventive subject matter, and preparation of a low dielectric constant film.

Example 1

Synthesis of Tetrabromoadamantane (TBA)

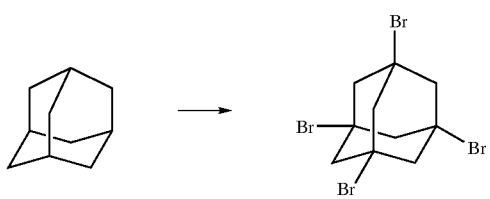

Adamantane is brominated to TBA following a procedure as previously described in *J. Org. Chem.* 45, 5405-5408 (1980), by Sollot, G. P. and Gilbert, E. E.

Synthesis of Tetrakis(3/4-bromophenyl)adamantane (TBPA)

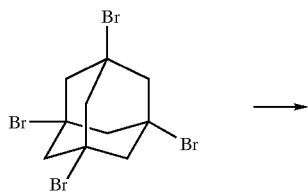

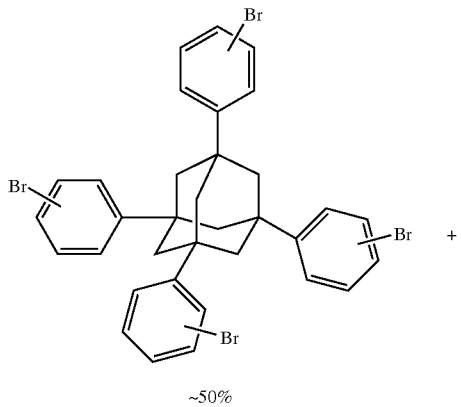

~50%

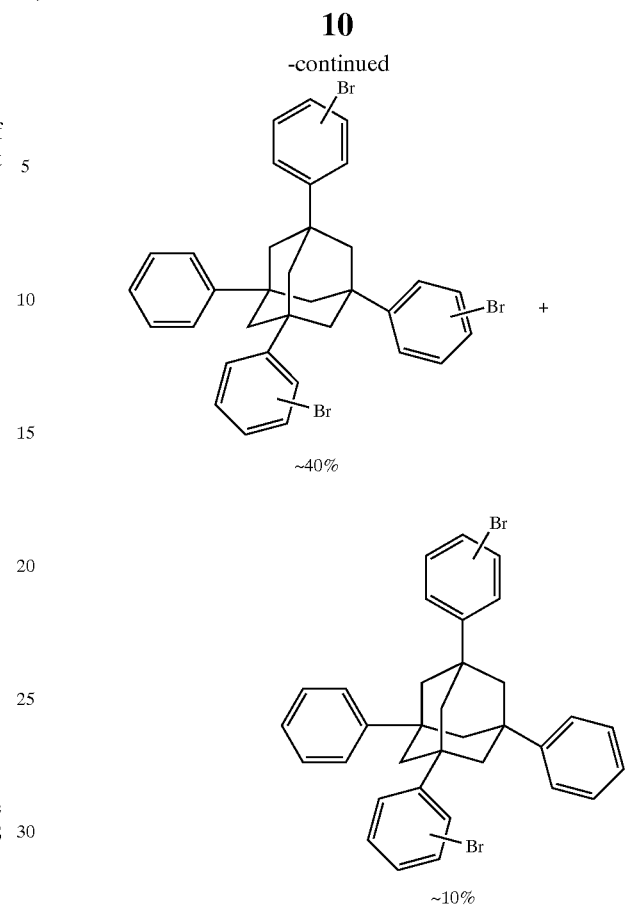

~40%

~10%

TBA was reacted with bromobenzene to yield tetrakis(3/4-bromophenyl)adamantane (TBPA) as described in *Macromolecules,* 27, 7015–7022 (1990) by Reichert, V. R. and Mathias L. J. The reaction resulted in the formation of various byproducts. HPLC-MS analysis showed that the yield of the desired TBPA was approximately 50%, accompanied by 40°/% of the tribrominated tetraphenyl adamantane and about 10% of the dibrominated tetraphenyladamantane. Unexpectedly, however, when the product mixture was subjected to fresh reagent and catalyst (bromobenzene and $AlCl_3$, 1 min at 20° C. ), TBPA was obtained in yields of approximately 90%.

Synthesis of Tetrakis(tolanyl)adamantane (TTA)

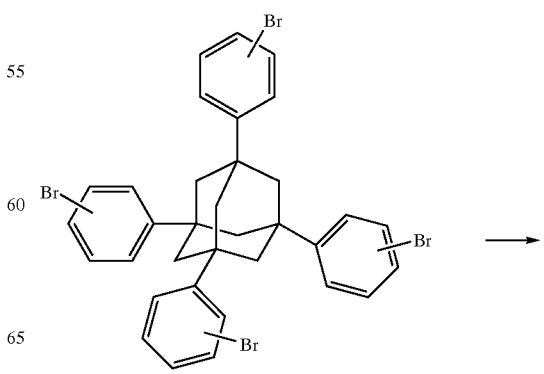

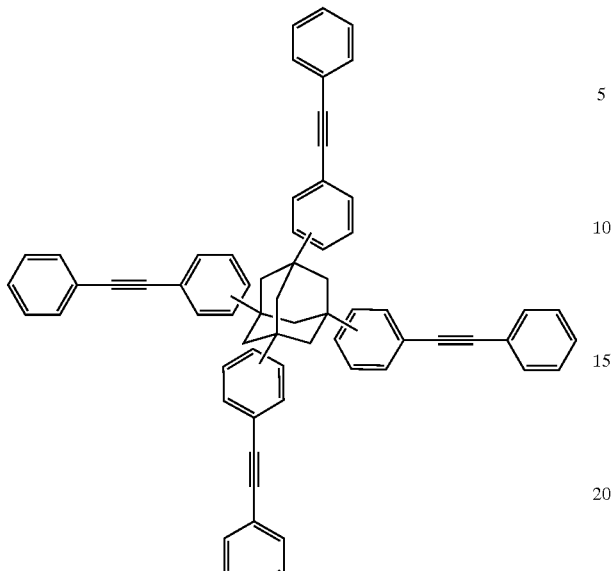

TBPA was reacted with phenylacetylene to yield the final product tetrakis(tolanyl)adamantane following a general reaction protocol for a palladium-catalyzed Heck ethynylation.

Example 2

Synthesis of p-bromotolane

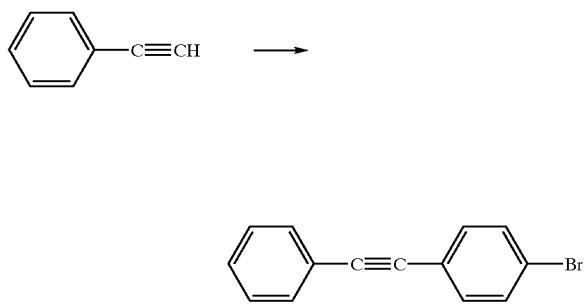

In a 500-mL 3-neck round-bottom flask, equipped with an addition funnel and a nitrogen gas inlet, 4-iodobromobenzene (25.01 g, 88.37 mmoL), triethylamine (300 mL), bis(triphenylphosphine)-paladium [II] chloride (0.82 g) and copper[I] iodide (0.54 g) were added. Then, a solution of phenylacetylene (9.025 g, 88.37 mmoL) in triethylamine (50 mL) was added slowly, and the temperature of the solution was kept under 35C under stirring. The mixture was stirred for another 4 hours after addition was completed. The solvent was evaporated on the rotary evaporator and the residue was added to 200 mL of water. The product was extracted with dichloromethane (2×150 mL),. The organic layers were combined and the solvents were removed by rotary evaporator. The residue was washed with 80 ml. hexanes and filtered. TLC and HPLC showed a pure product (yield, 19.5 g, 86%). Additional purification was performed by short silica column chromatography (Eluent is 1:2 mixture of toluene and hexanes). A white crystalline solid was obtained after solvent removal. The purity of the product was characterized by GC/MS in acetone solution, and further characterized by proton NMR.

Synthesis of p-Ethynyltolane

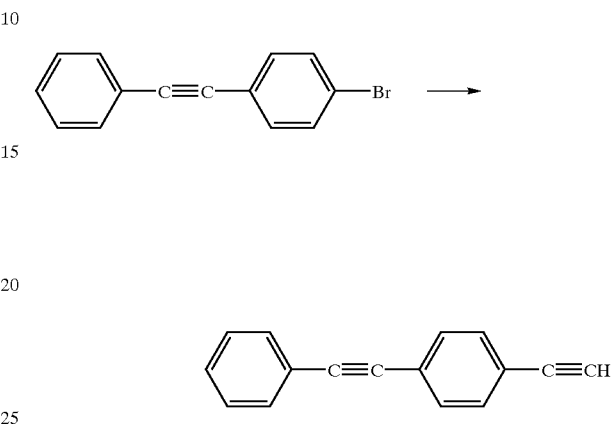

The synthesis of p-ethynyltolane from p-bromotolane was performed in two steps. In the first step, p-bromotolane was trimethylsilylethynylated, and in the second step, the reaction product of the first step was converted to the final endproduct.

Step 1 (Trimethylsilylethynylation of 4-bromotolane): 4-Bromotolane (10.285 g, 40.0 mMol), ethynyltrimethylsilane (5.894 g, 60.0 mMol), 0.505 g (0.73 mMol) of dichlorobis(triphenylphosphine)-palladium [II] catalyst, 40 mL of anhydrous triethylamine, 0.214 g (1.12 mMol) of copper[I] iodide, and 0.378 g (1.44 mMol) of triphenylphosphine were placed into the $N_2$ purged, 5-Liter 4-neck LS round-bottom flask, equipped with an overhead mechanical stirrer, condenser, and positioned inside a heating mantle. The mixture was heated to a gentle reflux (about 88° C.) and maintained at reflux for 1.5 hours. The reaction mixture became a thick black paste and was cooled. Thin-layer chromatographic analysis indicated complete conversion of starting material 4-bromotolane to a single product. The solids were filtered and washed with 50 mL of triethylamine, mixed with 400 mL of water and stirred for 30 minutes. The solids was filtered and washed with 40 mL of methanol. The crude solid was recrystallized from 500 mL of methanol. On standing, lustrous silver colored crystals settled out. They were isolated by filtration and washed with 2×50 mL of methanol. 4.662 g was recovered (42.5% yield).

Step 2 (Conversion of 4-(Trimethylsilyl)ethynyltolane to 4-Ethynyltolane): To a 1-Liter 3 neck round-bottom flask equipped with a nitrogen inlet, an overhead mechanical stirrer, was charged 800 mL of anhydrous methanol, 12.68 g (46.2 mMol) of 4-(trimethylsilyl)ethynyltolane, and 1.12 g of anhydrous potassium carbonate. The mixture was heated to 50° C. Stirring continued until no starting material is detected by HPLC analysis (about 3 hours). The reaction mixture was cooled.

The crude solids were stirred in 40 mL of dichloromethane for 30 min and filtered. The filtered suspended solids by HPLC showed mainly impurities. The dichloromethane filtrate was dried and evaporated to yield 8.75 g of a solid. On further drying in an oven, the final weight was 8.67 g, which represented L yield of 92.8%.

Synthesis of tetrakis(bistolanyl)admantane(TBTA)
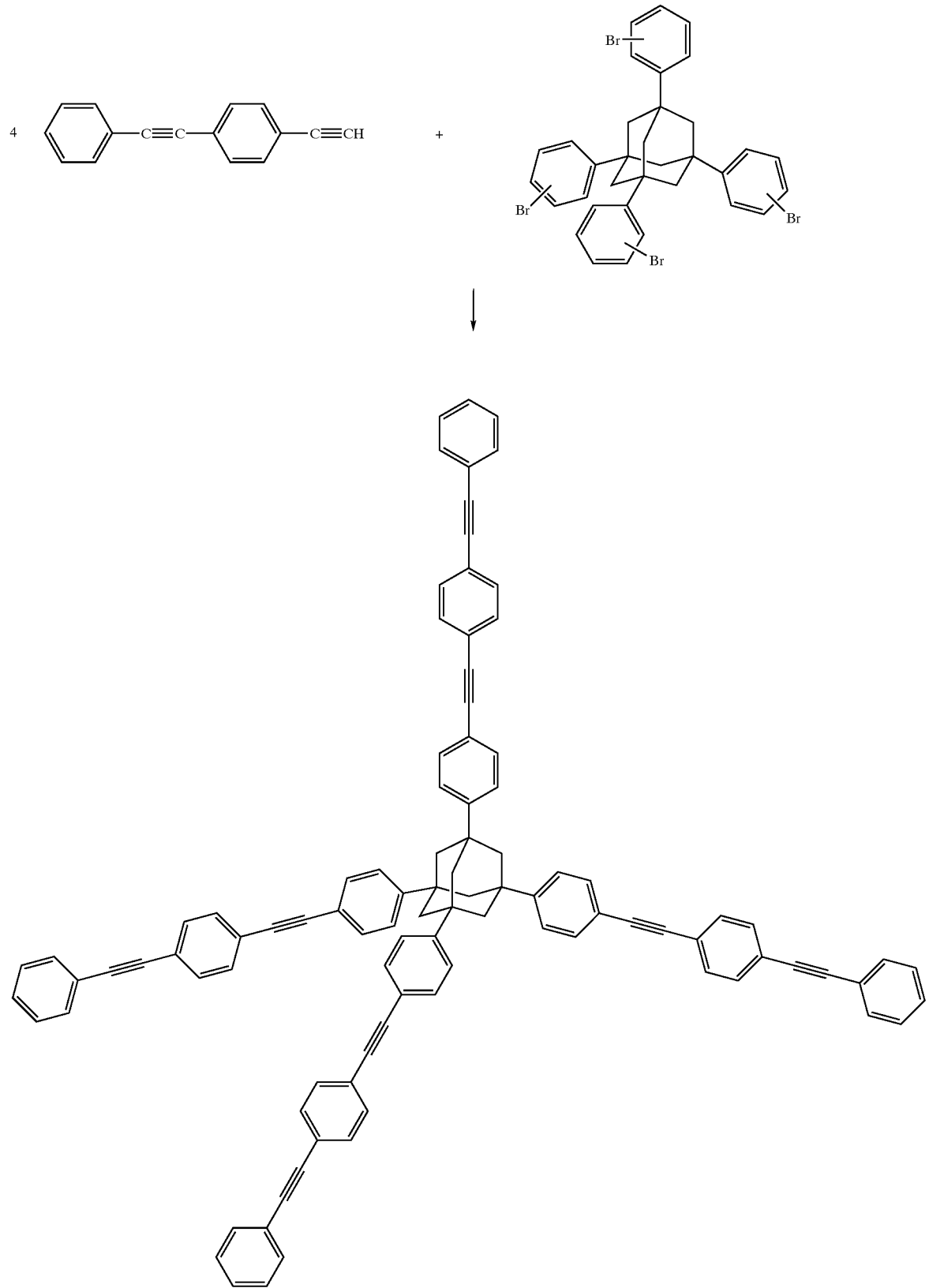

TBPA (supra) was reacted with 4-ethynyltolane to yield the final product tetrakis(bis-tolanyl)adamantane (TBTA) following a general protocol for a palladium-catalyzed Heck ethynylation reaction.

The so prepared TBTA was dissolved in cyclohexanone to obtain a 10% (by weight) solution 5 ml of which were spun onto two silicon wafers using standard procedures well known in the art. The TBTA was polymerized on the wafer by heating to a temperature of about 300° C., and cured at a temperature of 400° C. for 1 hour. The k-value was determined to be 2.57. It should be especially appreciated that when the k-value was compared to the k-value of TTA, (which is a structural analog to TBTA with a shortened length of the arms) the k-value of TTA was higher at about 2.60. Thus, the contemplated decrease in the k-value due to an increased length of the arms extending from the cage compound has been experimentally confirmed.

Thus, specific embodiments and applications of compositions and methods to produce a low dielectric constant polymer have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements,.components or steps may be present, or utilized, or combined with other elements, components, or steps that are not expressly referenced.

What is claimed is:

1. A method of producing a low dielectric constant polymer, comprising:

providing a thermosetting monomer having the structure

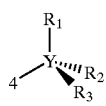

wherein Y is selected from a cage compound and a silicon atom, and $R_1$, $R_2$, $R_3$ and $R_4$ are independently selected from an aryl, a branched aryl, and all arylene ether, and wherein at least one of the aryl, the branched aryl, and the arylene ether has a triple bond; and incorporating the thermosetting monomer into a polymer thereby forming the low dielectric constant polymer, wherein the incorporation into the polymer comprises a chemical reaction of the triple bond.

2. The method of claim 1 wherein Y is selected from the group consisting of an adamantane, and a diamantane.

3. The method of claim 1 wherein the aryl comprises a moiety selected from the group consisting of a tolanyl, a phenylethynylphenylethynylphenyl, and a p-tolanylphenyl.

4. The method of claim 1 wherein the branched aryl comprises a 1,2-bis(phenylethynyl)phenyl.

5. The method of claim 1 wherein the arylene ether comprises a p-tolanylphenyl ether.

6. The method of claim 1 wherein at least three of the aryl, the branched aryl, and the arylene ether have a triple bond, and wherein the incorporation into the polymer comprises a chemical reaction of the at least three triple bonds.

7. The method of claim 1 wherein all of the aryl, the branched aryl, and the arylene ether have a triple bond, and wherein the incorporation into the polymer comprises a chemical reaction of all of the triple bonds.

8. The method of claim 1 wherein $R_1$, $R_2$, $R_3$ and $R_4$ have a total length L, and the low dielectric constant polymer has a dielectric constant K, and wherein K decreases when L increases.

9. The method of claim 1 wherein the polymer comprises a poly(arylene ether).

10. The method of claim 1 wherein the step of incorporating the thermosetting monomer into the polymer takes place without participation of an additional molecule.

11. A thermosetting monomer having the structure

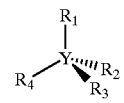

wherein Y is selected from a cage compound, and $R_1$, $R_2$, $R_3$, and R4 are independently selected from an aryl, a branched aryl, and an arylene ether, and wherein at least one of the aryl, the branched aryl, and the arylene ether has a triple bond; and wherein the cage compound is selected from a diamantine molecule, a bridged cyclic aliphatic molecule, an aromatic molecule, and a fullerene molecule.

12. A thermosetting monomer having a structure according to formula TM-1:
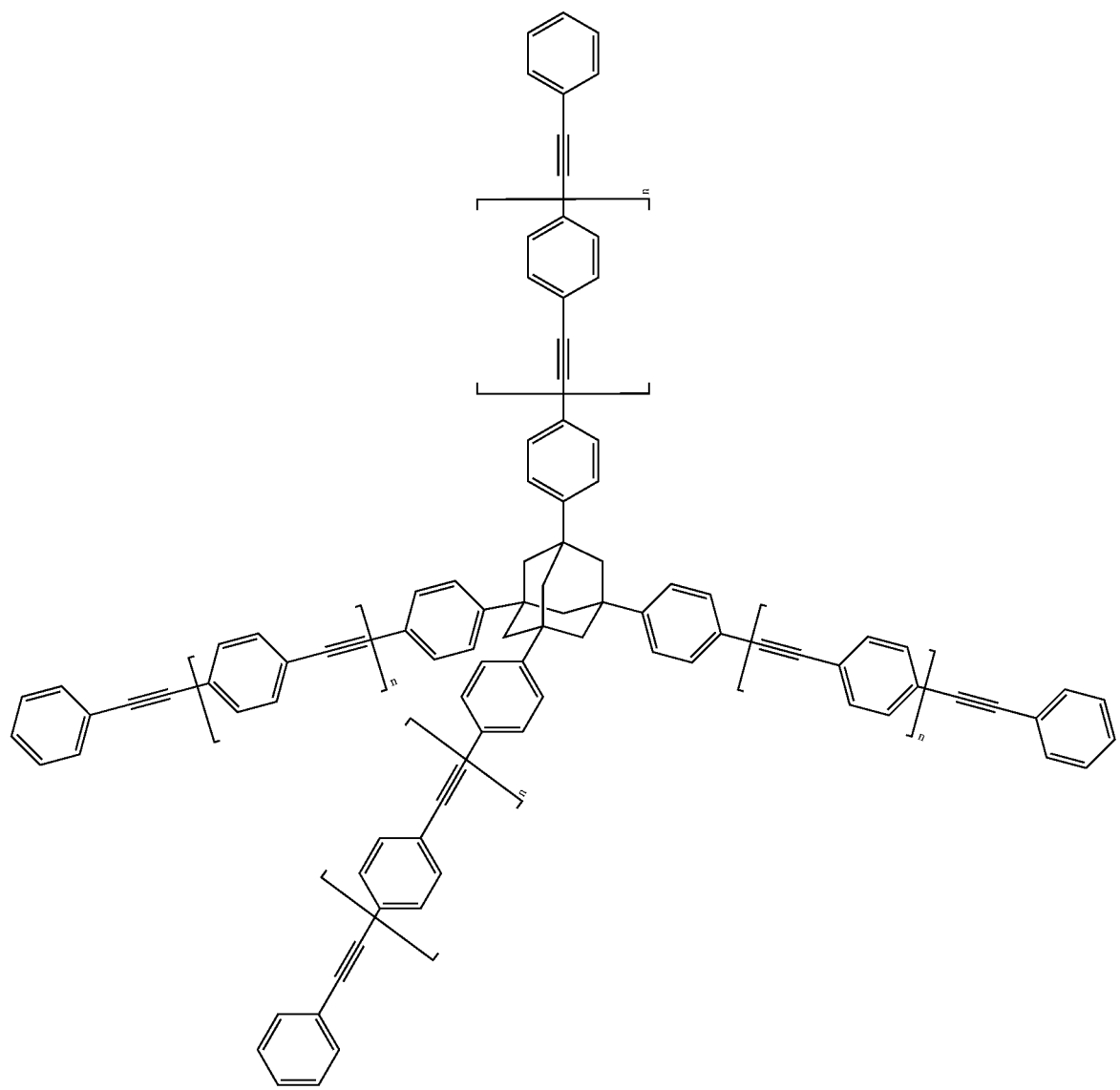
(TM-1)

wherein n=1–3.

13. A thermosetting monomer having a structure according to formula TM-2:

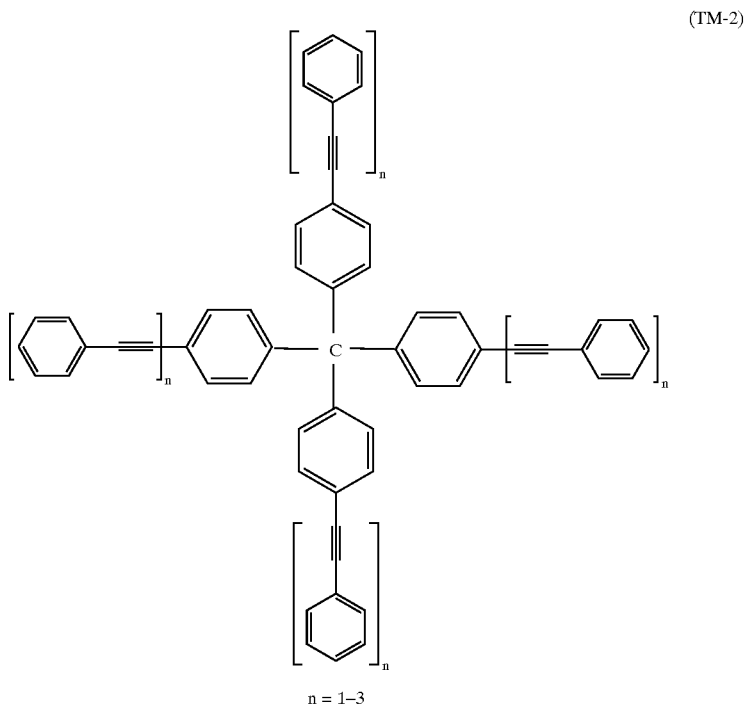

(TM-2)

n = 1–3 wherein n=1–3.

14. An electrical device including a dielectric layer comprising a polymer fabricated from at least one thermosetting monomer from the group consisting of:

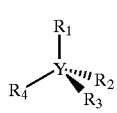

wherein Y is selected from a cage compound, and $R_1$, $R_2$, $R_3$, and $R_4$ are independently selected from an aryl, a branched aryl, and an arylene ether, and wherein at least one of the aryl, the branched aryl, and the arylene ether has a triple bond; and wherein the cage compound is selected from a diamantine molecule, a bridged cyclic aliphatic molecule, an aromatic molecule, and a fullerene molecule;

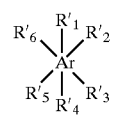

wherein Ar is an aryl, and $R'_1$, $R'_2$, $R'_3$, $R'_4$, $R'_5$, and $R'_6$ are independently selected from an aryl, a branched aryl, an arylene ether, and wherein each of the aryl, the branched aryl, and the arylene ether have at least one triple bond;

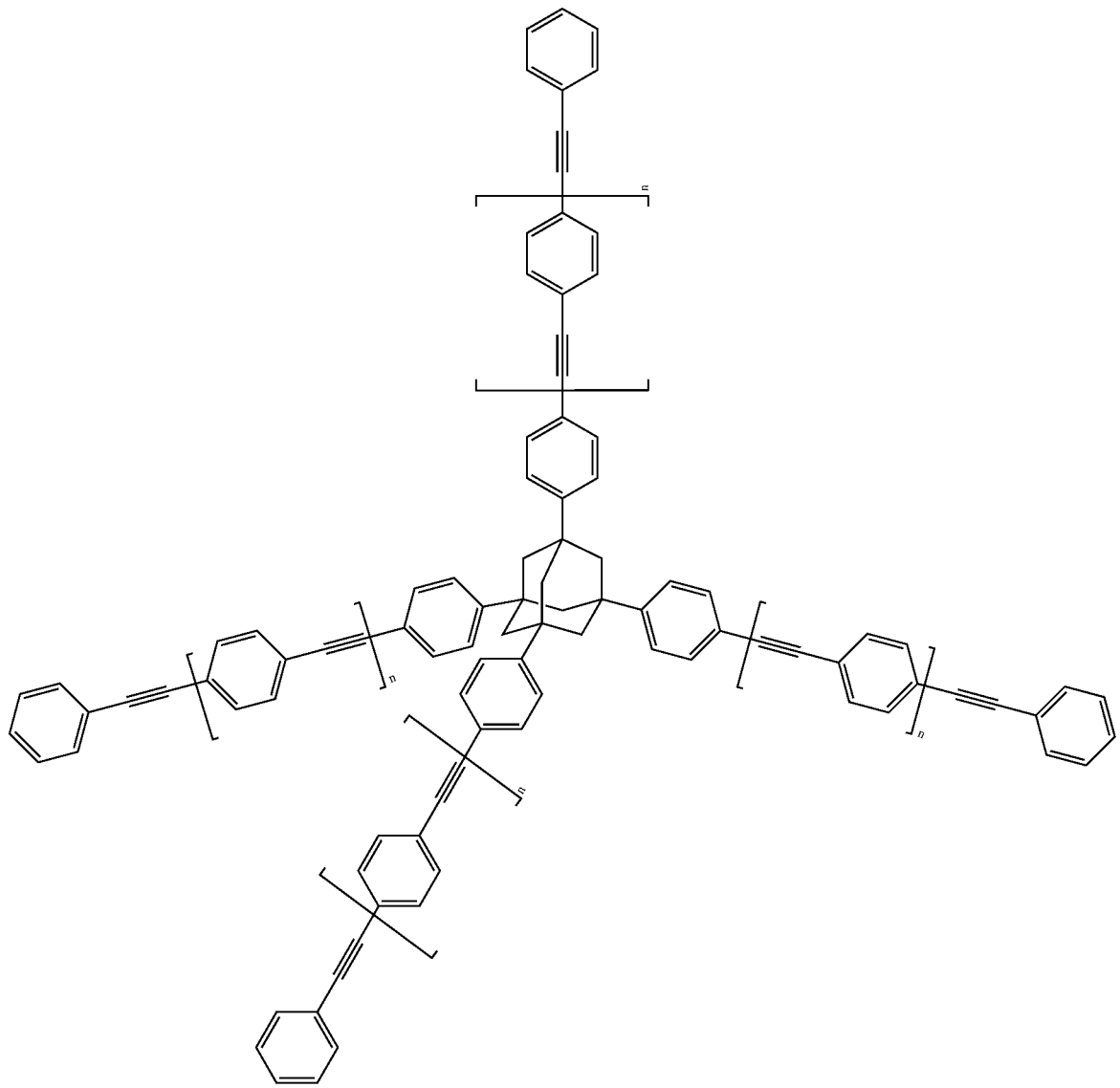

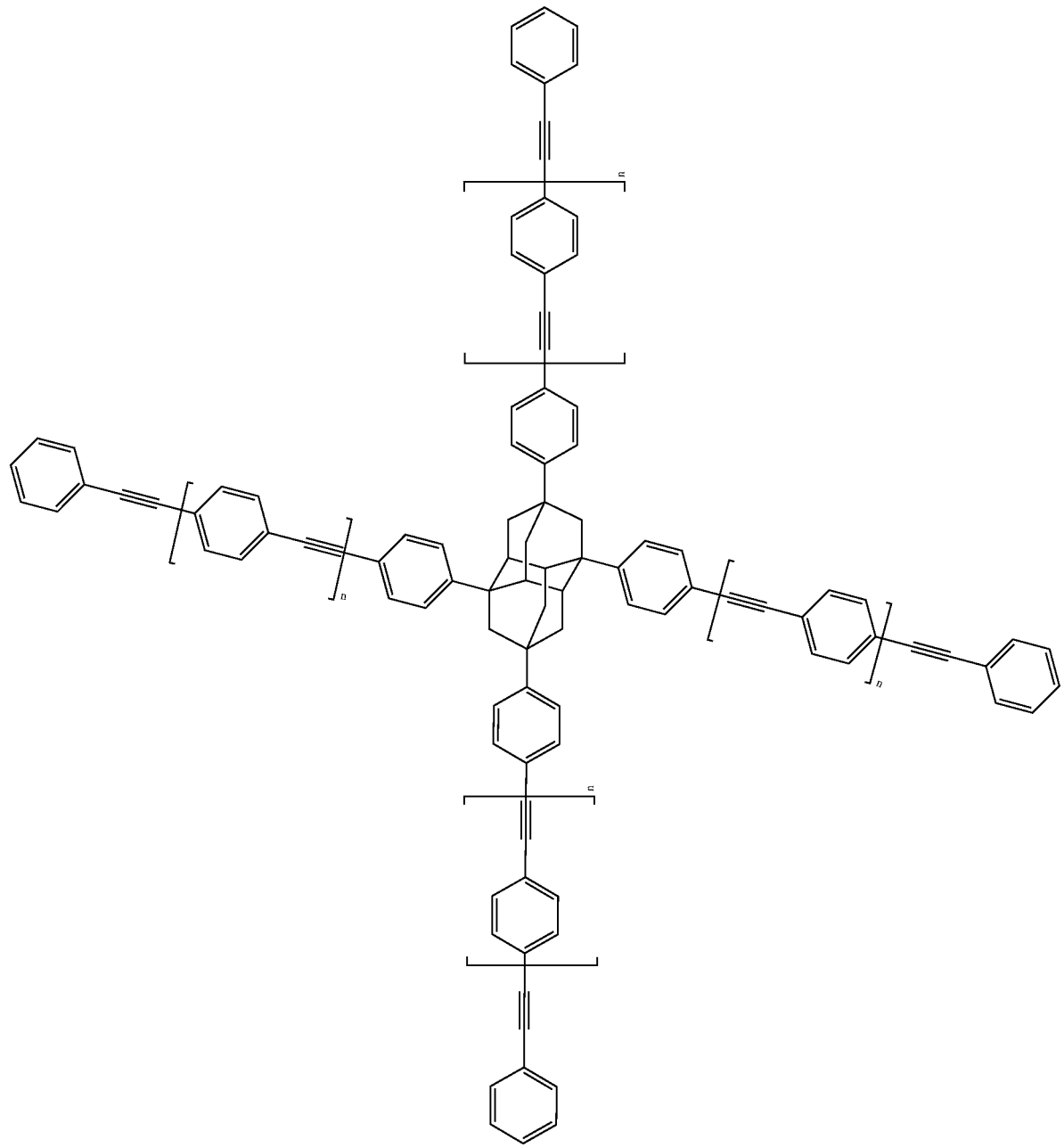
and

-continued
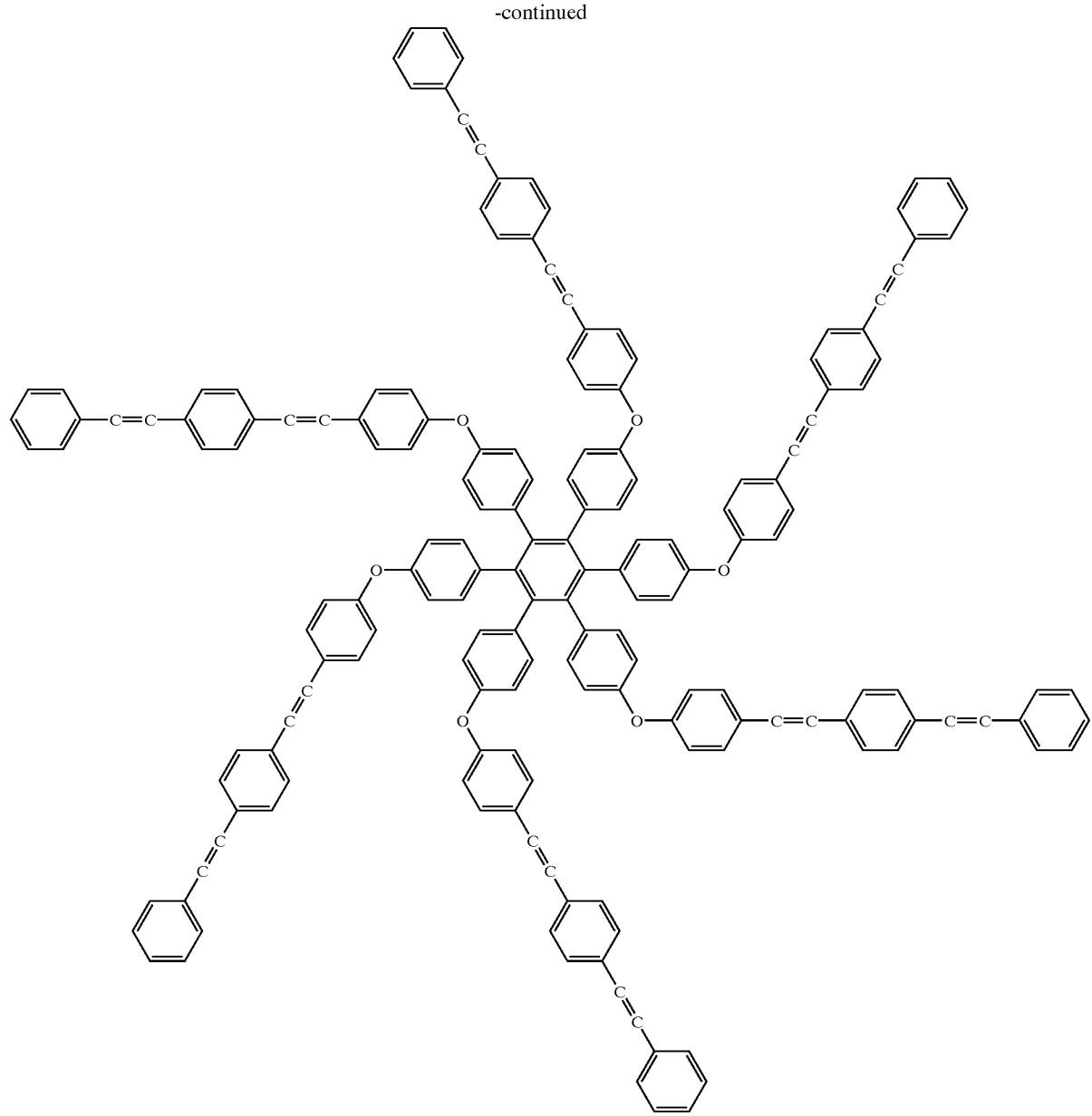
* * * * *